US010264229B2

(12) United States Patent
Sunkavalli et al.

(10) Patent No.: US 10,264,229 B2
(45) Date of Patent: *Apr. 16, 2019

(54) LIGHTING AND MATERIAL EDITING USING FLASH PHOTOGRAPHY

(71) Applicant: ADOBE SYSTEMS INCORPORATED, San Jose, CA (US)

(72) Inventors: Kalyan K. Sunkavalli, San Jose, CA (US); Zhuo Hui, Pittsburgh, PA (US); Sunil Hadap, Dublin, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,515

(22) Filed: Aug. 14, 2017

(65) Prior Publication Data

US 2017/0347080 A1 Nov. 30, 2017

Related U.S. Application Data

(63) Continuation of application No. 14/978,591, filed on Dec. 22, 2015, now Pat. No. 9,781,399.

(51) Int. Cl.
*H04N 9/73* (2006.01)
*H04N 5/225* (2006.01)
*H04N 5/232* (2006.01)
*G06K 9/46* (2006.01)
*G06T 7/00* (2017.01)
*H04N 1/60* (2006.01)

(52) U.S. Cl.
CPC ............. *H04N 9/73* (2013.01); *G06K 9/4661* (2013.01); *G06T 7/00* (2013.01); *H04N 1/6086* (2013.01); *H04N 5/2256* (2013.01); *H04N 5/23245* (2013.01); *H04N 9/735* (2013.01)

(58) Field of Classification Search
CPC ...... H04N 1/6077; H04N 9/73; H04N 5/2256; H04N 5/23245; H04N 9/735
See application file for complete search history.

(56) References Cited

U.S. PATENT DOCUMENTS

| 6,377,702 | B1 * | 4/2002 | Cooper | H04N 1/6077 358/522 |
| 6,839,088 | B2 * | 1/2005 | Dicarlo | G01N 21/55 348/223.1 |
| 7,457,477 | B2 | 11/2008 | Petschnigg et al. | |

(Continued)

OTHER PUBLICATIONS

Ebner, "Color Constancy Using Local Color Shifts," Computer Vision-ECCV 2004, pp. 276-287, Springer, 2004.

(Continued)

*Primary Examiner* — Nicholas G Giles
(74) *Attorney, Agent, or Firm* — Shook, Hardy & Bacon L.L.P.

(57) ABSTRACT

Embodiments of the present invention facilitate lighting and material editing. More particularly, some embodiments are directed to leveraging flash photography to capture two images in quick succession, one with the flash activated and one without. In embodiments, a scene may be decomposed into components corresponding to diffidently colored lights and into diffuse and specular components. This enables the color and intensity of each light in the scene, as well as the amount of specularity, to be edited by a user to change the appearance of the scene.

20 Claims, 11 Drawing Sheets

(56) References Cited

U.S. PATENT DOCUMENTS

| | | | | |
|---|---|---|---|---|
| 7,590,344 B2* | 9/2009 | Petschnigg | ............ | G03B 15/03 |
| | | | | 382/275 |
| 8,576,297 B2* | 11/2013 | Myhrvold | ............ | G06K 9/2027 |
| | | | | 348/223.1 |
| 8,736,709 B2 | 5/2014 | Myhrvold et al. | | |
| 9,215,433 B2 | 12/2015 | Rivard et al. | | |
| 9,781,399 B2* | 10/2017 | Sunkavalli | ............... | H04N 9/73 |
| 2004/0202365 A1* | 10/2004 | Spaulding | ............ | H04N 1/6077 |
| | | | | 382/162 |
| 2006/0008171 A1* | 1/2006 | Petschnigg | ............... | G06T 5/50 |
| | | | | 382/254 |
| 2010/0007765 A1* | 1/2010 | Myhrvold | .............. | H04N 9/735 |
| | | | | 348/223.1 |
| 2011/0234811 A1* | 9/2011 | Wang | ..................... | H04N 1/603 |
| | | | | 348/187 |
| 2013/0322745 A1* | 12/2013 | Lim | ........................ | H04N 9/73 |
| | | | | 382/162 |
| 2014/0160317 A1* | 6/2014 | Komada | .............. | H04N 5/2354 |
| | | | | 348/231.99 |
| 2015/0229898 A1* | 8/2015 | Rivard | ................... | H04N 9/735 |
| | | | | 348/223.1 |
| 2016/0044293 A1 | 2/2016 | Rivard et al. | | |
| 2016/0104284 A1* | 4/2016 | Maguire | .................. | G06T 7/80 |
| | | | | 348/187 |
| 2017/0180691 A1* | 6/2017 | Sunkavalli | ............... | H04N 9/73 |

OTHER PUBLICATIONS

Petschnigg, et al., "Digital Photography With Flash and No-Flash Image Pairs," ACM Transactions on Graphics (TOG), 23(3):664-672, 2004.

Hsu et al., "Light Mixture Estimation for Spatially Varying White Balance," ACM Transactions on Graphics (TOG), vol. 27, p. 70, ACM 2008, 7 pp.

Bousseau et al., "User-Assisted Intrinsic Images," ACM Transactions on Graphics (TOG), vol. 28, p. 130, ACM, 2009, 11 pp.

Boyadzhiev et al., "User-Guided White Balance for Mixed Lighting Conditions," ACM Trans. Graph., 31(6):200, 2012, 10 pp.

Preinterview First Office Action dated Mar. 3, 2017 in U.S. Appl. No. 14/978,591, 10 pages.

Notice of Allowance dated May 3, 2017 in U.S. Appl. No. 14/978,591, 19 pages.

* cited by examiner

US 10,264,229 B2

LIGHTING AND MATERIAL EDITING USING FLASH PHOTOGRAPHY

CROSS-REFERENCE TO RELATED APPLICATIONS

This application is a continuation of and claims priority from U.S. application Ser. No. 14/978,591, filed Dec. 22, 2015, which is assigned or under obligation of assignment to the same entity as this application, the entire contents of the application being herein incorporated by reference.

BACKGROUND

Lighting is a very crucial element of photographs and the ability to manipulate it post-capture can enable a number of useful image editing workflows. For example, photographs captured in outdoor photo-shoots may have harsh shadows because of direct sunlight and a photographer might want to remove the direct sunlight while retaining ambient skylight. In addition to lighting, material properties like specularity can also affect the visual appearance of a scene. Photographers often edit images to make them appear, depending on the situation, more or less glossy. However such edits are difficult to achieve because lighting and material properties affects different pixels in different ways and achieving high-quality results can take even very skilled artists a lot of time. Further, manual correction is often needed which requires considerable skill and time from the photographer.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to lighting and material editing. More particularly, some embodiments are directed to leveraging flash photography to capture two images in quick succession, one with the flash activated and one without. In embodiments, the non-flash image can be decomposed into components corresponding to differently colored lights and into diffuse and specular components. This enables the color and intensity of each light in the scene, as well as the amount of specularity, to be edited by a user to change the appearance of the scene.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed previously, photographs are often captured under lights with different colors leading to different color casts in different parts of images. Correcting the color of the lighting in a photograph is extremely challenging under mixed illumination because each pixel in the image has a different combination of lighting and needs to be handled differently. In addition to lighting and material properties like specularity can also affect the visual appearance of a scene. Editing these images is difficult because lighting and material properties affects different pixels in different ways and achieving high-quality results can take even very skilled artists a lot of time.

In some embodiments, the editing work-flows are greatly simplified by separating a photograph into components based on lighting and appearance. A contribution of each differently color light source to the observed intensity values (lights that are the same color and treated as a single light) can be estimated. By doing so, the image can be separated into diffuse and specular components. Each of these problems is highly under-constrained and typically cannot be solved without extensive user input or some knowledge about the lights, material properties, and geometry of the scene. By analyzing the two captured images (i.e., the flash and the non-flash image) the scene can be decomposed into components corresponding to different colored lights and into diffuse and specular components. This enables the color and intensity of each light in the scene, as well as the amount of specularity, to be edited which changes the appearance of the scene.

Figure 1:
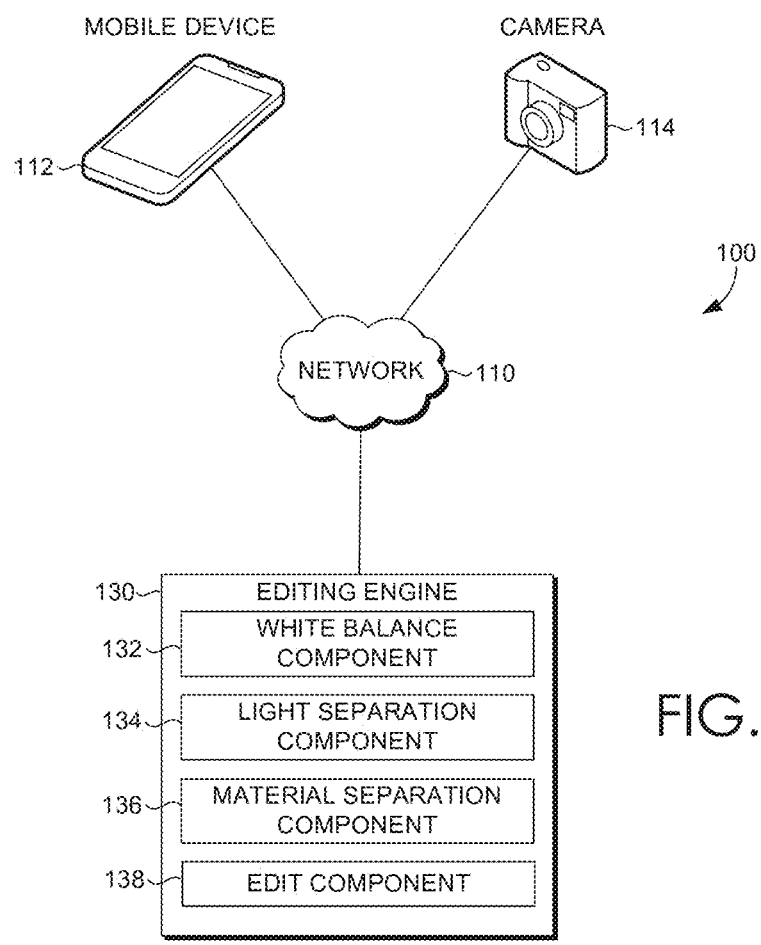
FIG. 1 is a block diagram showing a system for enabling editing of an image captured under mixed lighting conditions, in accordance with an embodiment of the present invention.

Referring now to FIG. 1, a block diagram is provided that illustrates an editing system 100 for enabling editing of images captured under mixed lighting conditions, in accordance with embodiments of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The editing system 100 generally operates to enable the user to efficiently edit characteristics of the image without extensive user input or knowledge about the lights, material properties, and geometry of the scene. To do so, two images are received, such as from a camera or mobile device. The first image is captured without utilizing flash and the second image is captured utilizing flash. The contribution of each colored lights source to observed intensity values in the first image can be estimated utilizing the first image and the second image. The colored lights sources may then be separated in the first image. This enables a user to edit a color or intensity of one or more colored light sources in the first image.

Among other components not shown, the system 100 includes a mobile device 112, a camera 114, and an editing engine 130. It should be understood that the system 100 shown in FIG. 1 is an example of one suitable computing system architecture. Each of the components shown in FIG. 1 may be implemented via any type of computing device, such as computing device 1100 described with reference to FIG. 1100, for example. The components may communicate with each other via a network 110, which may include, without limitation, one or more local area networks (LANs) and/or wide area networks (WANs). Such networking environments are commonplace in offices, enterprise-wide computer networks, intranets, and the Internet.

It should be understood that any number of mobile devices, cameras, editing engines, and networks may be employed within the system 100 within the scope of the present invention. Each may comprise a single device or multiple devices cooperating in a distributed environment. For instance, the editing engine 130 may be provided via multiple devices arranged in a distributed environment that collectively provide the functionality described herein. In another instance, portions of the editing engine 130 may be provided by the mobile device 112, camera 114, or as a web service provided in the cloud. Additionally, other components not shown may also be included within the environment 100, while components shown in FIG. 1 may be omitted in some embodiments.

The mobile device 112 and/or camera 114 may be any type of computing device owned and/or operated by a user that can capture images. In some embodiments, the mobile device 112 and/or camera 114 may allow the user to access network 110. Generally, a user may employ the mobile device 112 and/or camera 114 to, among other things, capture two images of a scene, in quick succession, one with the camera flash activated and one without. The user can efficiently edit characteristics of the image without extensive user input or some knowledge about the lights, material properties, and geometry of the scene. To do so, the user may employ an editing engine 130 on the mobile device 112 and/or camera 114 to view and edit the scene.

In some embodiments, editing engine 130 is configured to facilitate separating an image into its components and enabling the user to manipulate the components to create novel images. Typically, editing engine 130 communicates with the mobile device 112 and/or camera 114 to receive the two images of the scene. This enables the editing engine 130 to separate the scene into its components and provide the scene to the user via the mobile device 112 and/or camera 114 for editing. In accordance with embodiments described herein, the editing engine 130 includes a white balance component 132, a light separation component 134, a material separation component 136, and an edit component 138. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules are implemented as stand-alone applications. In other embodiments, one or more of the illustrated components/modules are integrated directly into the operating system of the editing engine 130, the mobile device 112, and/or the camera 114. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the editing engine 130 might reside on a server, cluster of servers, or a computing device remote from or integrated with one or more of the remaining components.

The editing engine 130 may be any type of computing device, or incorporated into a computing device, that can access a network (e.g., network 110). For instance, the editing engine 130 may be a desktop computer, a laptop computer, a tablet computer, a mobile device, a server, or any other device, or portion thereof, having network access. Generally, a user employs the editing engine 130 via the mobile device 112 and/or camera 114 to, among other things, edit a scene in an image.

As previously mentioned, in embodiments, the editing engine 130 includes a white balance component 132, a light separation component 134, a material separation component 136, and an edit component 138 to separate components for a scene in an image and enable the user to edit the components of the scene. In particular, editing engine 130 communicates with the mobile device 112, and/or camera 114 to automatically separate an image into its components. Generally, to initiate automatic separation, an image is captured by the mobile device 112 and/or camera 114.

The white balance component is generally configured to estimate a white balance kernel for each pixel in an image captured without flash. The white balance kernel is the correction factor that can be applied at each pixel in the image such that the color of the lights at each pixel can be tuned as neutral. In other words, the white balance kernel can be utilized to convert the color of light that appears in the image to white. This correction prevents the color of an object in the image from being distorted from the ground truth. Initially, white balance component 132 receives the image captured without flash ($I_{nf}$) and the corresponding flash image ($I_f$). In general, white balance component 132 has no knowledge of the white-balance kernel for a specific pixel. However, white balance component 132 can utilize user-driven white-balancing algorithms or automated white-balancing algorithms (such as the one described in further detail below) to estimate the white balance kernel for each pixel in the image.

The light separation component 134 is generally configured to estimate the contribution of each differently colored light source to the observed intensity values (lights that are the same color are treated as a single light). This is a highly under-constrained problem and typically cannot be solved without extensive user input or some knowledge about the lights, material properties, and geometry of the scene. The images (i.e., non-flash and flash) can be analyzed together by light separation component 134 to perform the initial decomposition, which is discussed in more detail below. Several assumptions may be made by the light separation component 134. First, it is assumed that most of the objects appearing in the scene are Lambertian. Second, it is assumed that the color of the flash can be acquired via calibration with the light separation component 134.

The material separation component 136 is generally configured to separate the non-flash image into diffuse and specular components. Like the light separation problem, material separation is a highly under-constrained problem and typically cannot be solved without extensive user input or some knowledge about the lights, material properties, and geometry of the scene. The images (i.e., non-flash and flash) can be analyzed together by material separation component 136 to perform the initial decomposition, which is discussed in more detail below. The same assumptions made above with respect to the light separation component 134 are made by the material separation component 136.

This enables the user, via edit component 138, to edit the components of the scene by changing the corresponding color and/or intensity of one or more of the single lights or the diffuse or specular reflection in the first image to generate new images. For example, the user can utilize a toolbar or menu provided by the edit component 138 to select a new color or modify the intensity of one or more of the single lights to generate a new image. In the same way, the user can utilize a toolbar or menu provided by the edit component to change the diffuse or specular reflection to generate a new image. Light separation component 134 can further restrict the problem by considering the scene is lit by a certain number of global lights rather than the mixed local lights. This provides immense reduction in the unknowns without losing significant generality for the most real life scenes. Light separation component 134 also assumes that the number of global lights in the scene is known.

Figure 2:
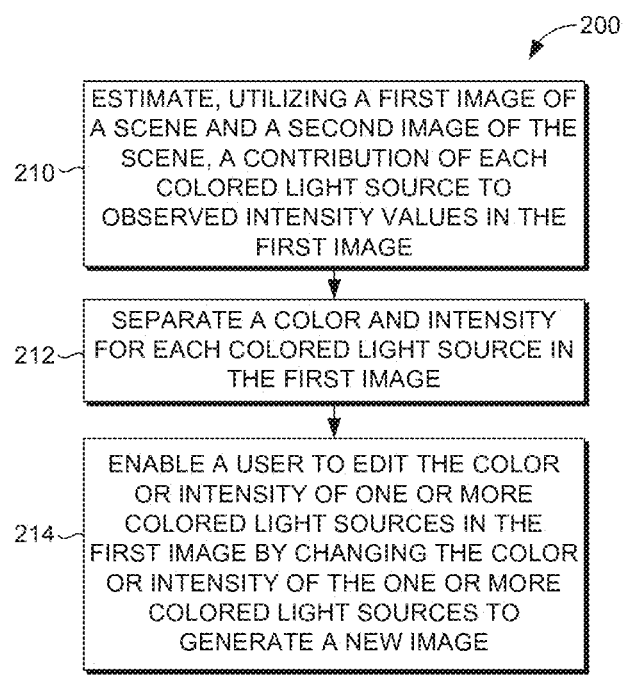
FIG. 2 is a flow diagram showing a method for enabling editing of an image, in accordance with an embodiment of the present invention.

Referring now to FIG. 2, a flow diagram is provided that illustrates a method 200 for enabling editing of an image in accordance with an embodiment of the present invention. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be provided as part of an editing system, such as the editing system 100 of FIG. 1. Accordingly, the method may be carried out utilizing any of the algorithms described herein.

As shown at step 210, utilizing a first image of a scene and a second image of the scene, a contribution is estimated of each colored light source to observed intensity values in the first image. The first image is captured without utilizing flash and a second image is captured utilizing flash. In one embodiment, the color of the flash is acquired via calibration.

In some embodiments, the white balance kernel may be automatically determined for each pixel in the image. Once the image captured without flash shooting ($I_{nf}$) and the corresponding flash image ($I_f$) are received, for a specific pixel p, the intensity value for a single color channel c of $I_{nf}$ is defined based on the Lambertian assumption:

$$I_{nf}^c(p) = R^c(p)\Sigma_i \lambda_i(p) l_i^c(p) \quad \text{Equation (1)}$$

In Equation (1), R denotes the albedo and $l_i$ is the color of each light source in the scene. Similarly, the intensity value for the flash image can be defined by:

$$I_f^c(p) = R^c(p)\Sigma_i \lambda_i(p) l_i^c(p) + R^c(p) \lambda_f(p) l_f^c(p) \quad \text{Equation (2)}$$

In Equation (2), $\lambda_f(p)$ and $l_f^c(p)$ denote the shading term and the color of the flash. A per-pixel kernel Wc (i.e., the correction factor) is identified for each color channel c such that the white balanced image ($\hat{I}_{nf}$) can be represented as:

$$\hat{I}_{nf}^c(p) = W^c(p) R^c(p) \Sigma_i \lambda_i(p) l_i^c(p) = R^c(p) \Sigma_i \lambda_i(p) \eta(p) \quad \text{Equation (3)}$$

To separate the light sources, and with reference to Equation (3), η is a scalar and does not vary across the color channels. Specifically, the white balance kernel can be expressed by:

$$\Sigma_i \lambda_i(p) W^c(p) l_i^c(p) = \Sigma_i \lambda_i(p) \eta(p) \quad \text{Equation (4)}$$

Then, $l_i^c$ in Equation (4) above can be considered as independent of the spatial location and the relation can be simplified as:

$$\sum_i \lambda_i(p) W^c(p) l_i^c = \sum_i \lambda_i(p) \eta(p)$$

By denoting $$\lambda_i(p) = \frac{\lambda_i(p)}{\sum_i \lambda_i(p)\eta(p)},$$

the above equation can be rewritten as:

$$\frac{1}{W^c(p)} = \sum_i \lambda_i(p) l_i^c \quad \text{Equation (5)}$$

Equation (5) can be rewritten in matrix form as:

$$B = \begin{pmatrix} \frac{1}{W^r(p_1)}, & \frac{1}{W^g(p_1)}, & \frac{1}{W^b(p_1)} \\ & \vdots & \\ \frac{1}{W^r(p_N)}, & \frac{1}{W^g(p_N)}, & \frac{1}{W^b(p_N)} \end{pmatrix} = \quad \text{Equation (6)}$$

$$\begin{bmatrix} \lambda_1(p_1) & \cdots & \lambda_K(p_1) \\ & \vdots & \\ \lambda_1(p_N) & \cdots & \lambda_K(p_N) \end{bmatrix} \begin{bmatrix} l_1^r & l_1^g & l_1^b \\ & \vdots & \\ l_K^r & l_K^g & l_K^b \end{bmatrix} = \Lambda L$$

where N is the number of the pixels of the image, r, g, b denote different color channels and K is the number of global lights. Moreover, all the entries of Λ and L should be non-negative (i.e. $\Lambda \in \mathbb{R}_-^{N \times K}$, $L \in \mathbb{R}_+^{K \times 3}$).

The contribution of each of the colored light sources in the scene is separated, at step 212. Thus, the lighting separation problem that seeks to retrieve the light color can be formulated from a non-negative matrix factorization framework.

$$\{\hat{\Lambda}, \hat{L}\} = \arg\min_{\Lambda, L} \|B - \Lambda L\|_F^2 \text{, such that}$$

$$\Lambda_{ij} \geq 0, L_{mn} \geq 0, \forall_{i,j,m,n} \quad \text{Equation (7)}$$

Given the estimated $\hat{L}$, each light (row of $\hat{L}$) is normalized with unit norm. Then, the color and/or intensity of each light can be changed at step 214 (such as by utilizing a toolbar or menu as described above with respect to the editing engine 130) and combined with the white balance results to generate the scene lit under different lighting conditions.

Figure 3:
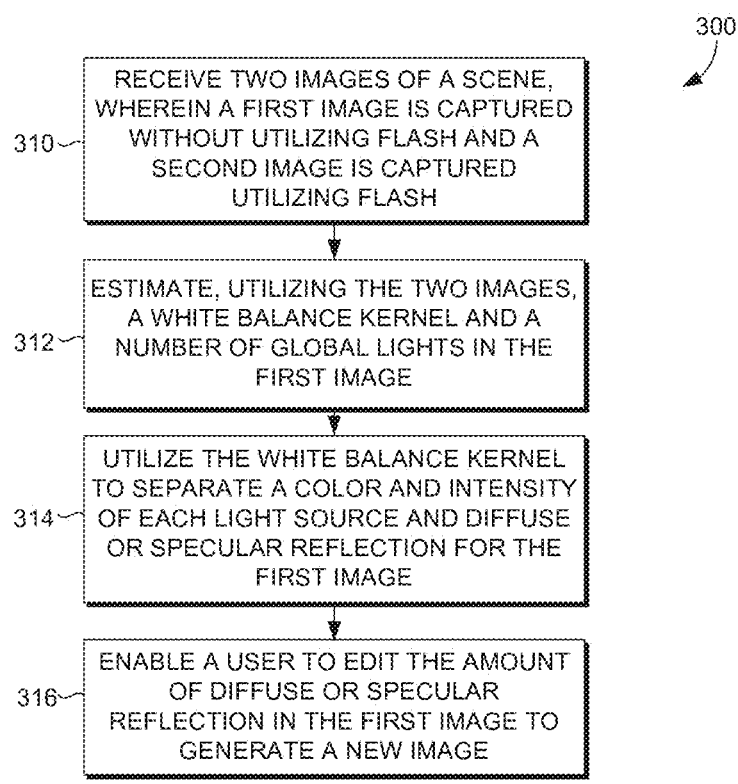
FIG. 3 is a flow diagram showing a method for enabling of images captured under mixed lighting conditions in accordance with an embodiment of the present invention.
Figure 4:
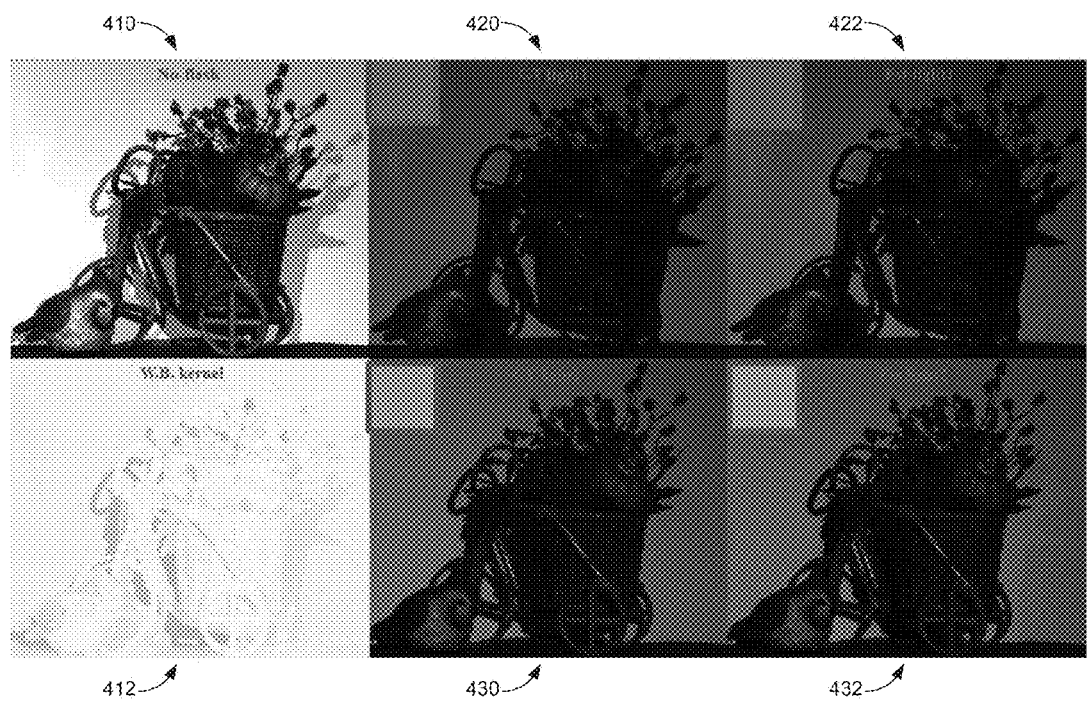
FIGS. 4-10 are color images illustrating light separation and editing, in accordance with embodiments of the present invention.

Turning now to FIG. 3, a flow diagram is provided that illustrates a method 300 for enabling editing of images captured under mixed lighting conditions in accordance with an embodiment of the present invention. As shown at step 310, two images are received. A first image is captured without utilizing flash and a second image is captured utilizing flash. A white balance kernel and a number of global lights are estimated in the first image, at step 312.

The white balance kernel can be utilized to separate mixed lights for the first image. In addition, given the knowledge of the lighting, the diffuse or specular reflection can be separated, at step 314, for the pure flash image, which enables the amount of diffuse or specular reflection in the scene to be edited by a user, such as by utilizing a toolbar or menu as described above with respect to the editing engine 130, at step 316. The intensity observed at pixel p in the pure flash image is denoted as $I_{pf}(p)$ and its value is given as:

$$I_{pf}(p) = I_f(p) - I_{nf}(p)$$

Due to specular reflectance in the pure flash image, the Dichromatic model is adopted to represent the bidirectional reflectance distribution function at each pixel. Accordingly, the pure flash image can be rewritten as:

$$I_{pf}^c(p) = R^c(p) \lambda_f^d(p) l_f^c + \lambda_f^s(p) l_f^c \quad \text{Equation (8)}$$

where $\lambda_f^d$ denotes the diffuse shading term and $\lambda_f^s$ denotes the specular component. To estimate the $\lambda_f^s$ from the pure flash image, a reference is identified that can guide the estimation. Since the color of the flash is known, the pure flash image can be white balanced and Equation (8) can be rewritten as:

$$\hat{I}_{pf}^c(p) = R^c(p) \lambda_f^d(p) + \lambda_f^s(p) \quad \text{Equation (9)}$$

The sum of albedo can be denoted as $R(p) = \Sigma_c R^c(p)$ and the albedo chromaticity $$\hat{R}^c(p) = \frac{R^c(p)}{\sum_0 R^c(p)}$$

and replaces the term $R^c(p) \lambda_f^d(p)$ with $\hat{R}^c(p) R(p) \lambda_f^d$.

$R^c(p) \lambda_f^d$ can be defined as $\hat{\lambda}_f^d$ and Equation (9) can be further simplified as:

$$\hat{I}_{pf}^c(p) = \hat{R}^c(p) \hat{\lambda}_f^d + \lambda_f^s$$

Similar to diffuse reflectance, $\hat{\lambda}_f^s = \frac{1}{3} \lambda_f^s$ and the above equation can be rewritten as:

$$\hat{I}_{pf}^c(p) = \hat{R}^c(p) \hat{\lambda}_f^d + \frac{1}{3} \lambda_f^s(p) \quad \text{Equation (10)}$$

Note that $\Sigma_c \hat{R}^c(p) = 1$, and the $\hat{I}_{pf}^c(p)$ is summed across all the color channels as:

$$\hat{I}_{pf}(p) = \hat{\lambda}_f^d(p) + \hat{\lambda}_f^s(p) \quad \text{Equation (11)}$$

However, $\hat{\lambda}_f^s$ cannot be estimated from Equation (11) because the problem is unconstrained. However, the maximum intensity chromaticity can be defined as:

$$\dot{C}_{nf}(p) = \frac{\max\left\{\hat{I}_{nf}^r(p), \hat{I}_{nf}^g(p), \hat{I}_{nf}^b(p)\right\}}{\hat{I}_{pf}(p)}$$

By denoting $\dot{R}(p)$ as the maximum of the albedo chromaticity, the above equation can be rewritten as:

$$\dot{C}_{nf}(p) = \frac{\dot{R}(p) \hat{\lambda}_f^d(p) + \frac{1}{3} \hat{\lambda}_f^s(p)}{\hat{I}_{pf}(p)} \quad \text{Equation (12)}$$

Separation component 134 utilizes Equation (11) and Equation (12) to derive that:

$$\hat{\lambda}_f^d(p) = \frac{\hat{I}_{pf}(p)(3 C_{nf}(p) - 1)}{\dot{C}_{nf}(p)(3 \dot{R}(p) - 1)} \quad \text{Equation (13)}$$

Thus, to generate a specular free image, the $\dot{R}(p)$ value is set in Equation (13) with a constant scalar value across all the pixels, and $\hat{\lambda}_f^d(p)$ is denoted as the intensity value at pixel p in the specular free image. Because the geometrical profile of the specular free image and the diffuse reflectance can be considered the same and the specular reflectance should be sparse for the whole image, the problem can be formulated as a well posed optimization:

$$\{\hat{s}\} = \underset{s}{\text{argmin}} \|D(i - s) - DR\|_2^2 + \lambda \|s\|_1, \text{ s.t. } 0 \leq s \leq i \quad \text{Equation (14)}$$

where D denotes the gradient operator in matrix form and $i = [\hat{I}_{pf}(p_1) \ldots \hat{I}_{pf}(p_N)]^T$, $s = [\hat{\lambda}_f^s(p_1) \ldots \hat{\lambda}_f^s(p_N)]^T$, $r = [\hat{\lambda}_f^d(p_1) \ldots \hat{\lambda}_f^d(p_N)]^T$ and N is the number of the pixels in the image. The optimization problem in Equation (14) requires a projected lasso problem to be solved. In embodiments, the soft-thresholding algorithm (ISTA) can be utilized to obtain the solution. The updating rule is:

$$G \leftarrow D^T D(r + i - s^k)$$

$$s^{k+1} \leftarrow S_{\lambda t}(s^k - G)$$

$$s^{k+1} \leftarrow \max\{\min\{s^{k+1}, i\}, 0\}$$

where t denotes the step size and is updated by backtracking line search, and S represents the soft thresholding operator.

In some embodiments, white balance kernels are detected at unreliable pixels. White balance correction may be interpolated for the unreliable pixels based on similar pixels (i.e., pixels similar in color) observed in the first image. Unreliable pixels may include shadow regions, specular regions, or regions where there is motion between the first image and the second image. The user editing of the color and/or intensity of one or more of the single lights in the first image may be combined with white balancing to generate a new image lit by new lighting conditions.

FIGS. 4-10 are color photographs illustrating light separation and editing, in accordance with embodiments of the present invention. With initial reference to FIG. 4, an image without flash 410 is illustrated. As shown, the lighting in the image without flash includes multiple colors. The ground truth for each of the colored lights is shown in images 420, 430. After the white balance kernel for the image 412 is estimated, the lights of the image may be separated resulting in an estimated image for each of the colored lights 422, 432.

Figure 5:
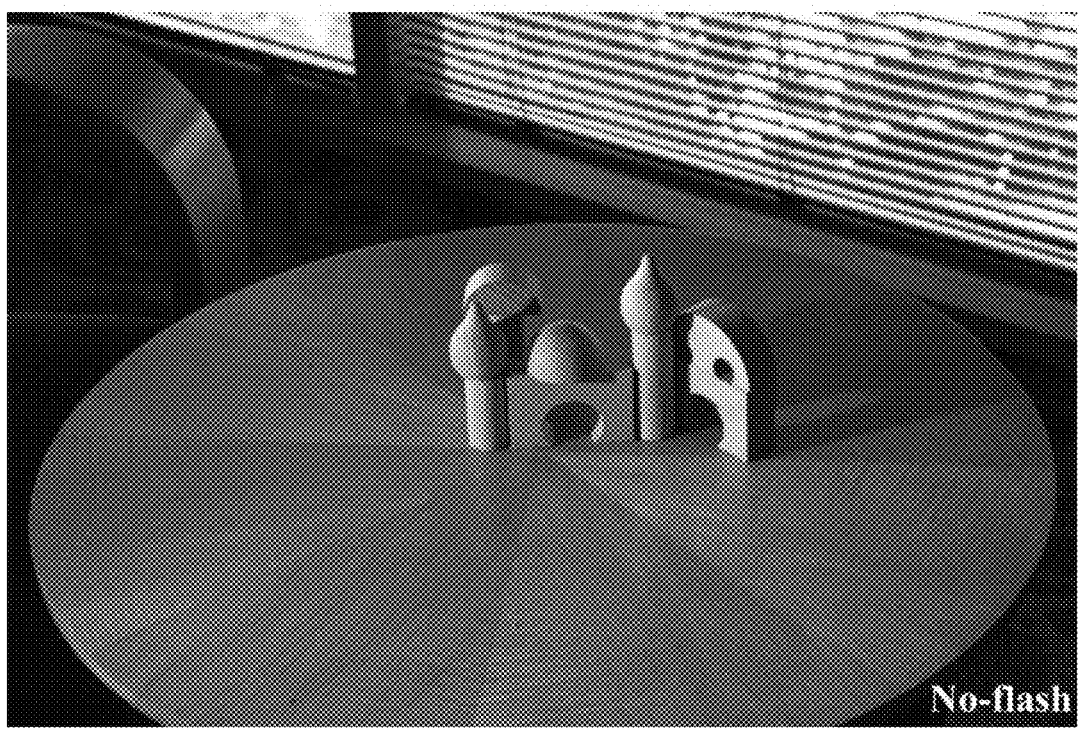
Figure 6:
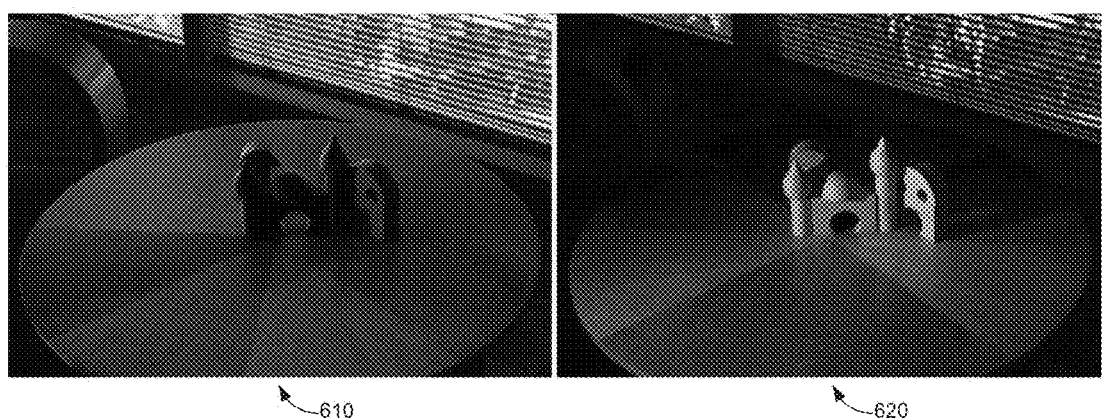
Figure 7:
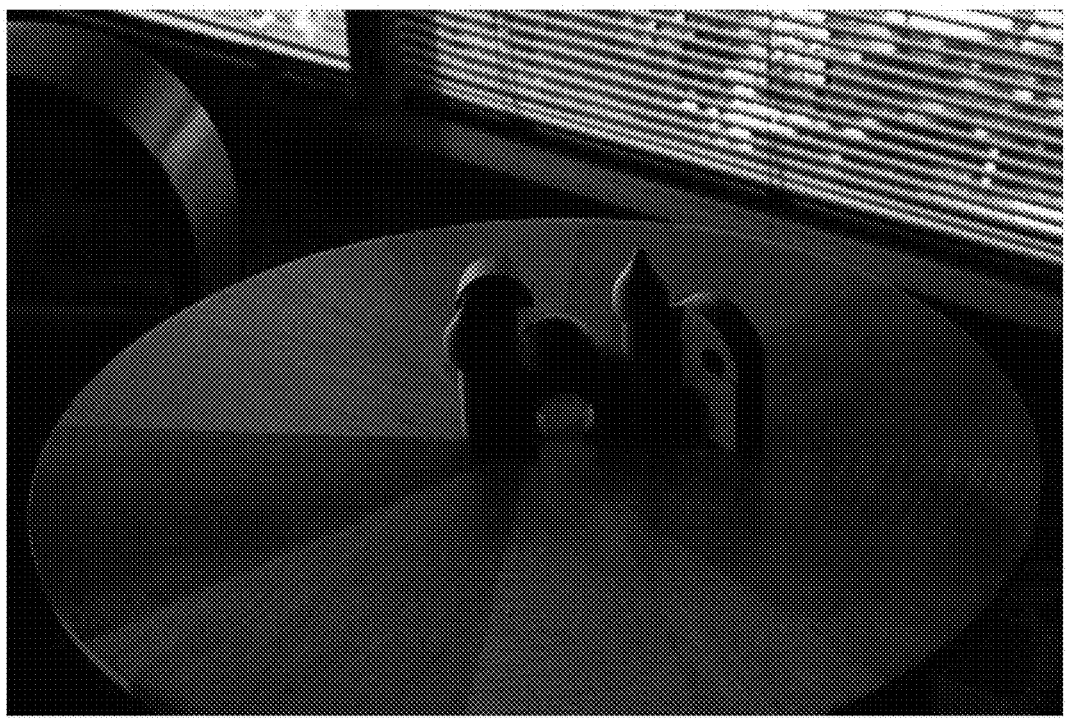
Figure 8:
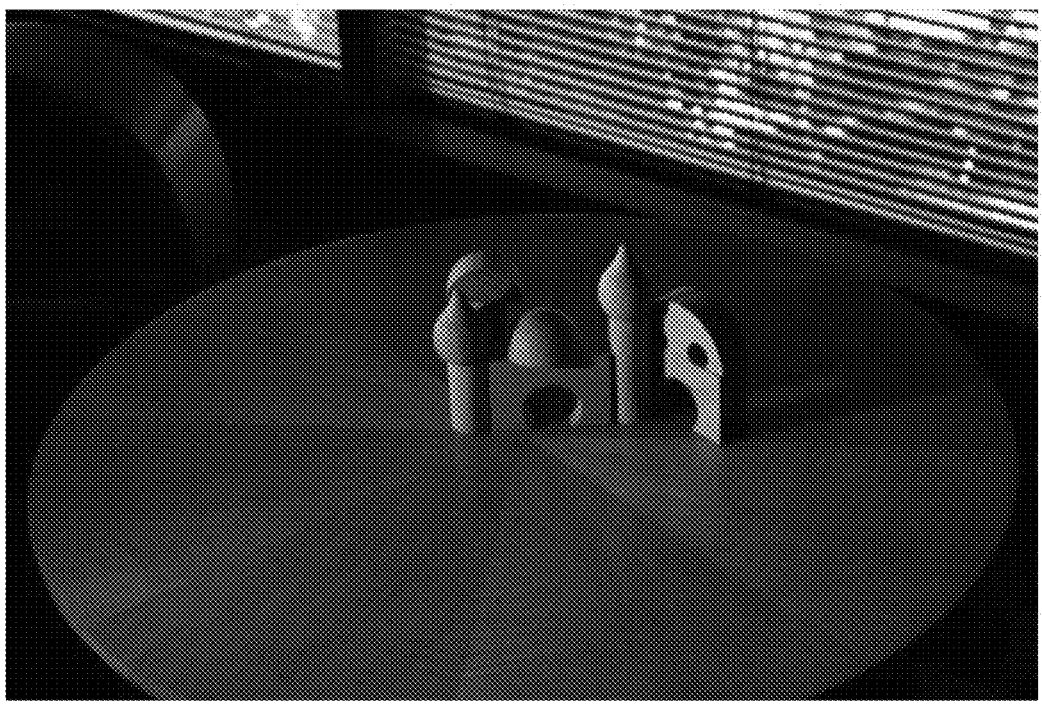
Figure 9:
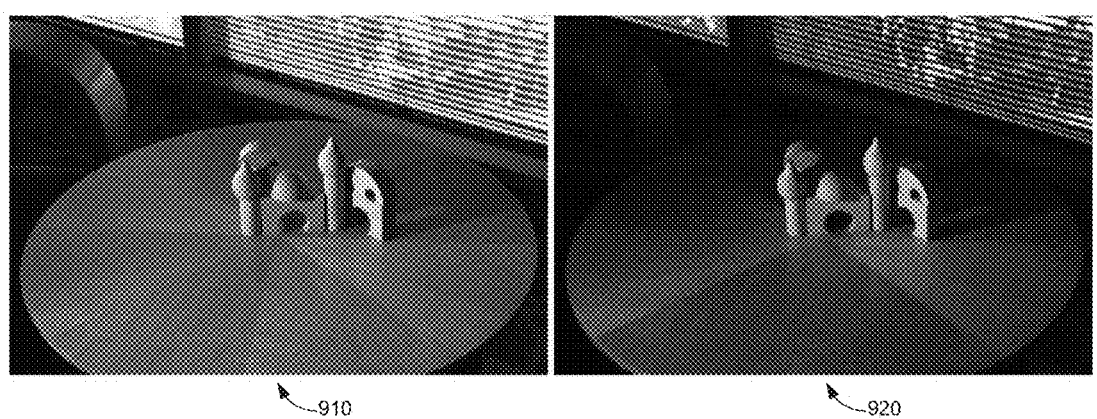
Figure 10:
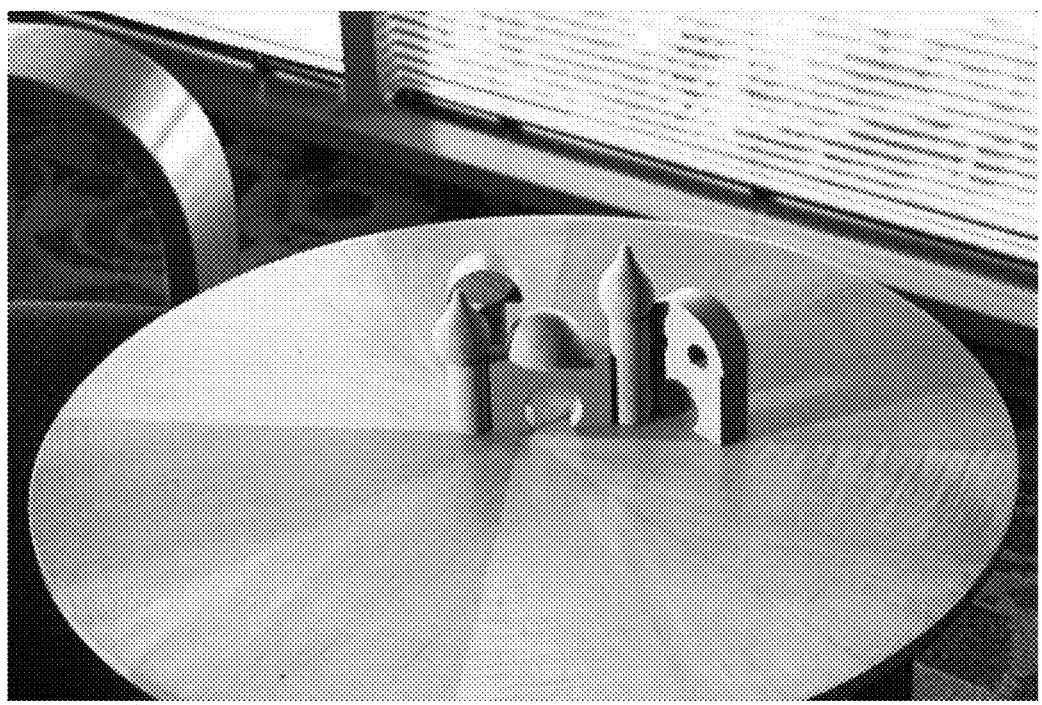

Turning now to FIGS. 5-10, with reference initially to FIG. 5, another image without flash 500 is illustrated. The lighting in image 500 may be separated into outdoor lighting 610 and indoor lighting 620, as shown in FIG. 6. Utilizing embodiments of the present invention and referring now to FIGS. 7-10, each of images 700, 800, 910, 920, 1000 may be edited by the user to alter the lighting and/or intensity of one or more colored light sources in the image. This enables the user to change the particular lighting in one portion of the image to make the overall image easier to see. For example, image 800 has been edited to show the outdoor lighting in the background portion of the scene but retain the indoor lighting in the foreground. As can be appreciated, such editing can enable a photograph to eliminate undesirable effects of various lighting conditions while retaining desirable ones.

Figure 11:
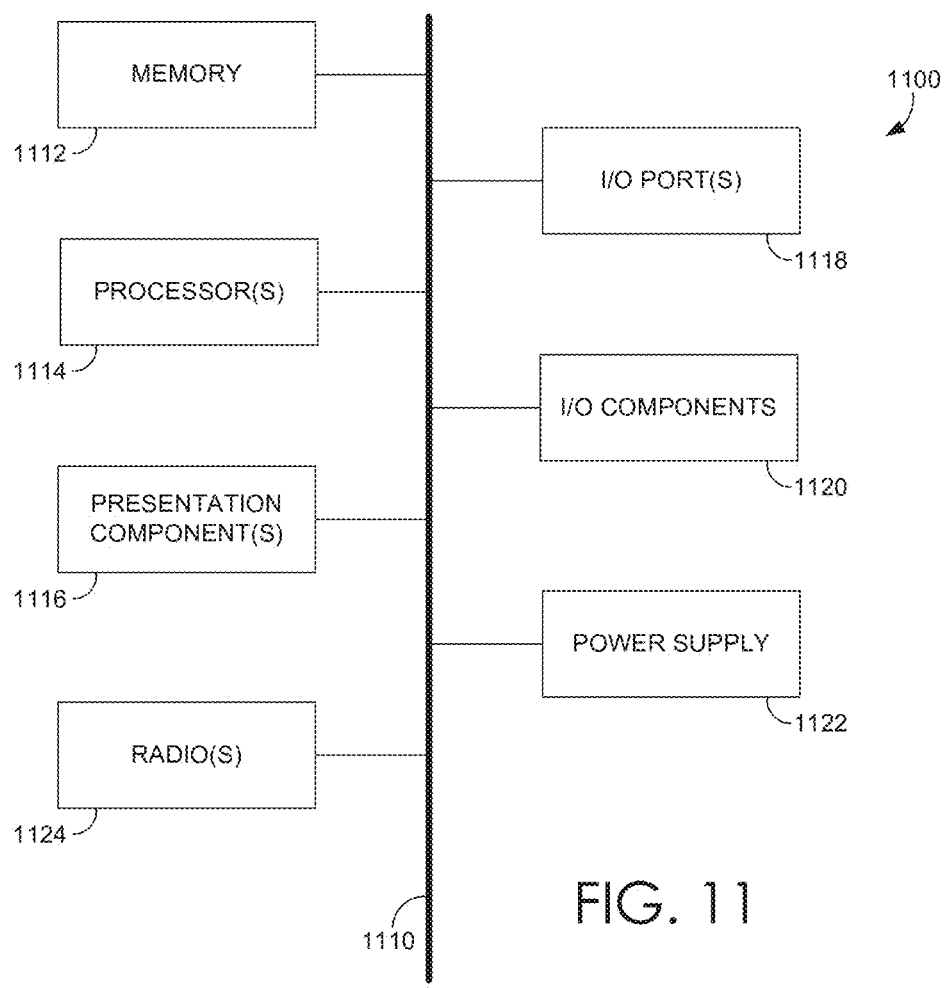
FIG. 11 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, embodiments of the present invention enabling editing of images captured under mixed lighting conditions. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. At least one non-transitory computer storage media storing computer-useable instructions that, when used by one or more computing devices, cause the one or more computing devices to perform operations to generate specular free images, the operations comprising:
obtaining a first image and a second image of a scene, wherein the first image was captured with ambient lighting and the second image was captured with flash lighting, wherein at least a first pixel of the first image corresponds to at least a second pixel of the second image;
determining, for at least the first pixel and at least the corresponding second pixel, an intensity value of at least a first color channel;
estimating a white balance kernel for at least the second pixel based at least in part on the intensity value of at least the first color channel determined for at least the second pixel; and
generating a specular free image of the scene based at least in part on the white balance kernel estimated for at least the second pixel and the intensity value of at least the first color channel determined for at least the first pixel.

2. The at least one non-transitory computer storage media of claim 1, wherein the white balance kernel for at least the second pixel is estimated based further in part on the intensity value of at least the first color channel determined for at least the first pixel.

3. The at least one non-transitory computer storage media of claim 1, wherein the white balance kernel for at least the second pixel is estimated based further in part on a color of the flash lighting.

4. The at least one non-transitory computer storage media of claim 3, wherein the color of the flash lighting is determined via calibration.

5. The at least one non-transitory computer storage media of claim 1, wherein a diffuse shading term and a specular component of at least a portion of the second image are determined as a function of at least the determined intensity value of at least the first color channel for at least the first pixel and at least the corresponding second pixel.

6. The at least one non-transitory computer storage media of claim 5, wherein the specular free image is generated as a function of the determined diffuse shading term and specular component.

7. The at least one non-transitory computer storage media of claim 5, wherein the intensity value of at least the first color channel determined for at least a third pixel of the specular free image is determined as a function of the determined diffuse shading term and specular component.

8. The at least one non-transitory computer storage media of claim 7, wherein the specular free image is generated having at least the third pixel.

9. A computerized method for generating specular free images, the computerized method comprising:
obtaining, by a computing device, a first image and a second image of a scene, wherein the first image was captured with ambient lighting and the second image was captured with flash lighting, wherein at least a first pixel of the first image corresponds to at least a second pixel of the second image;
determining, by the computing device for at least the first pixel and at least the corresponding second pixel, an intensity value of at least a first color channel;
estimating, by the computing device, a white balance kernel for at least the second pixel based at least in part on a color of the flash lighting; and
generating, by the computing device, a specular free image of the scene based at least in part on the white balance kernel estimated for at least the second pixel and the intensity value of at least the first color channel determined for at least the first pixel.

10. The computerized method of claim 9, wherein the white balance kernel for at least the second pixel is estimated based further in part on the intensity value of at least the first color channel determined for at least the second pixel.

11. The computerized method of claim 9, wherein the white balance kernel for at least the second pixel is estimated based further in part on the intensity value of at least the first color channel determined for at least the first pixel.

12. The computerized method of claim 9, wherein the color of the flash lighting is determined via calibration.

13. The computerized method of claim 9, wherein a diffuse shading term and a specular component of at least a portion of the second image are determined as a function of at least the determined intensity value of at least the first color channel for at least the first pixel and at least the corresponding second pixel.

14. The computerized method of claim 13, wherein the specular free image is generated as a function of the determined diffuse shading term and specular component.

15. The computerized method of claim 13, wherein the intensity value of at least the first color channel determined for at least a third pixel of the specular free image is determined as a function of the determined diffuse shading term and specular component.

16. The computerized method of claim 15, wherein the generated specular free image includes at least the third pixel.

17. A computerized system comprising:
at least one processor; and
a non-transitory computer storage media storing computer-useable instructions that, when used by the at least one processor, cause the at least one processor to:
obtain a first image and a second image of a scene, wherein the first image was captured with ambient lighting and the second image was captured with flash lighting, wherein at least a first pixel of the first image corresponds to at least a second pixel of the second image;

determine, for at least the first pixel and at least the corresponding second pixel, an intensity value of at least a first color channel;

estimate a white balance kernel for at least the second pixel based at least in part on a color of the flash lighting and the intensity value of at least the first color channel determined for at least the second pixel; and generate a specular free image of the scene based at least in part on the white balance kernel estimated for at least the second pixel and the intensity value of at least the first color channel determined for at least the first pixel.

18. The computerized method of claim 17, wherein the white balance kernel for at least the second pixel is estimated based further in part on the intensity value of at least the first color channel determined for at least the first pixel.

19. The computerized method of claim 17, wherein a diffuse shading term and a specular component of at least a portion of the second image are determined as a first function of at least the determined intensity value of at least the first color channel for at least the first pixel and at least the corresponding second pixel.

20. The computerized method of claim 19, wherein at least a third pixel of the specular free image that corresponds to at least the first and second pixels is generated as a function of the determined diffuse shading term and specular component.

* * * * *